Dec. 16, 1952     O. W. SCHOTZ     2,621,525
CONTROL FOR MOTOR VEHICLE TRANSMISSIONS
Filed Sept. 21, 1946     4 Sheets-Sheet 1

INVENTOR.
Otto W. Schotz.
BY
Harness and Harris
ATTORNEYS.

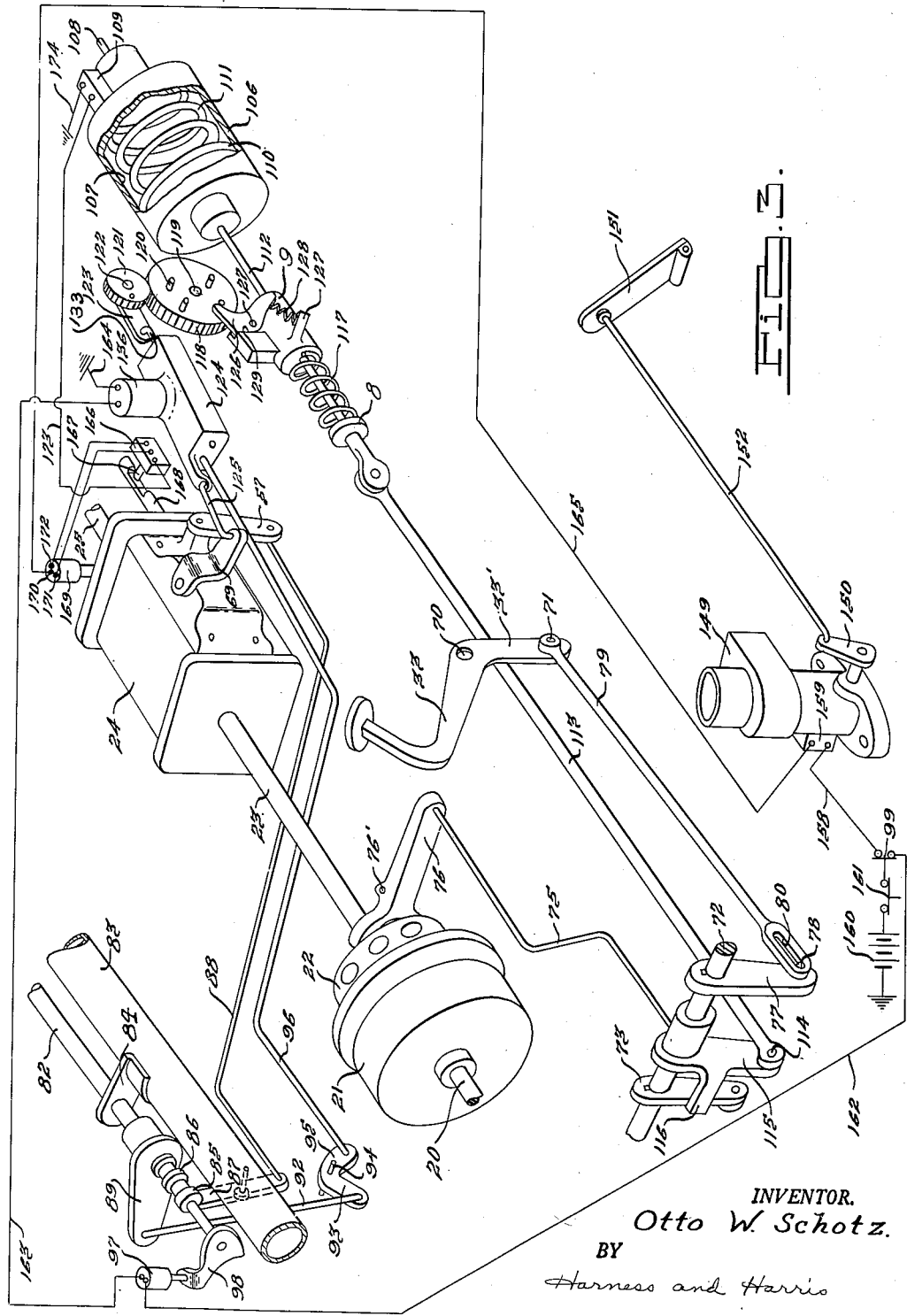

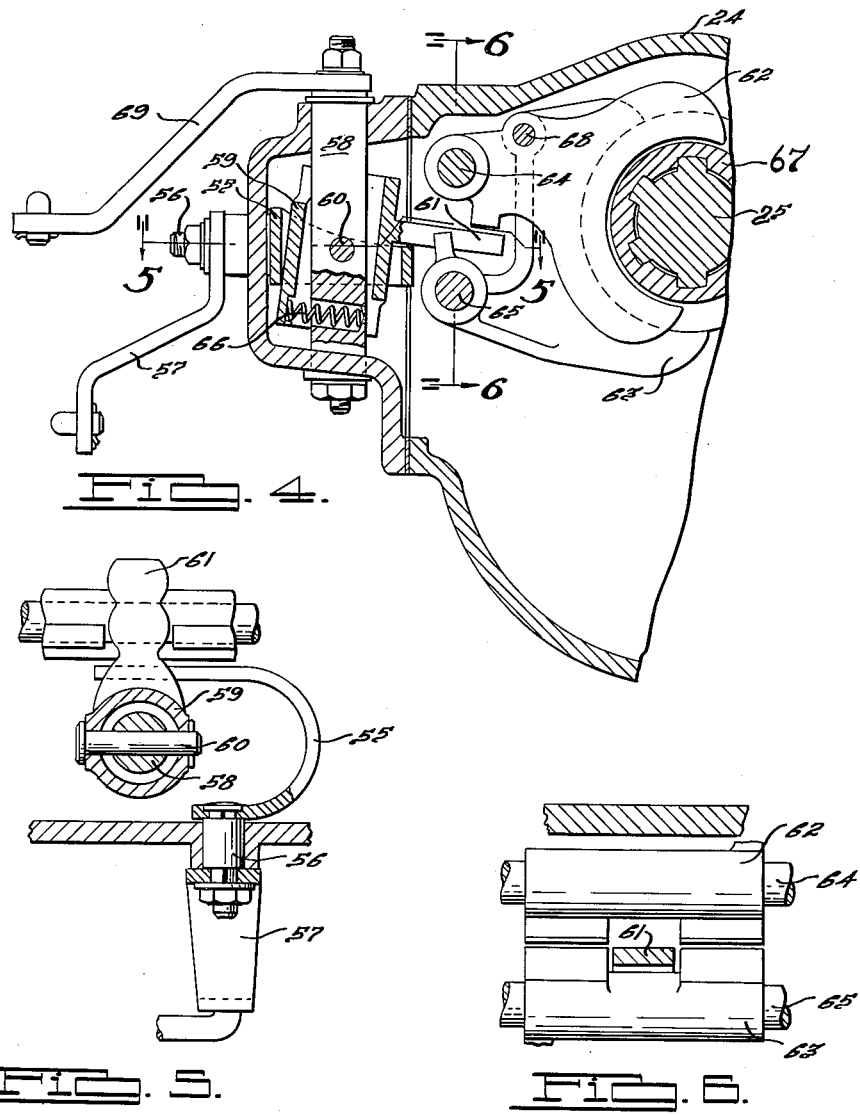
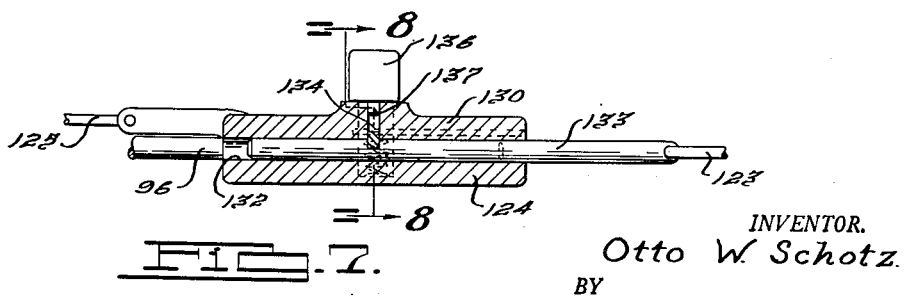

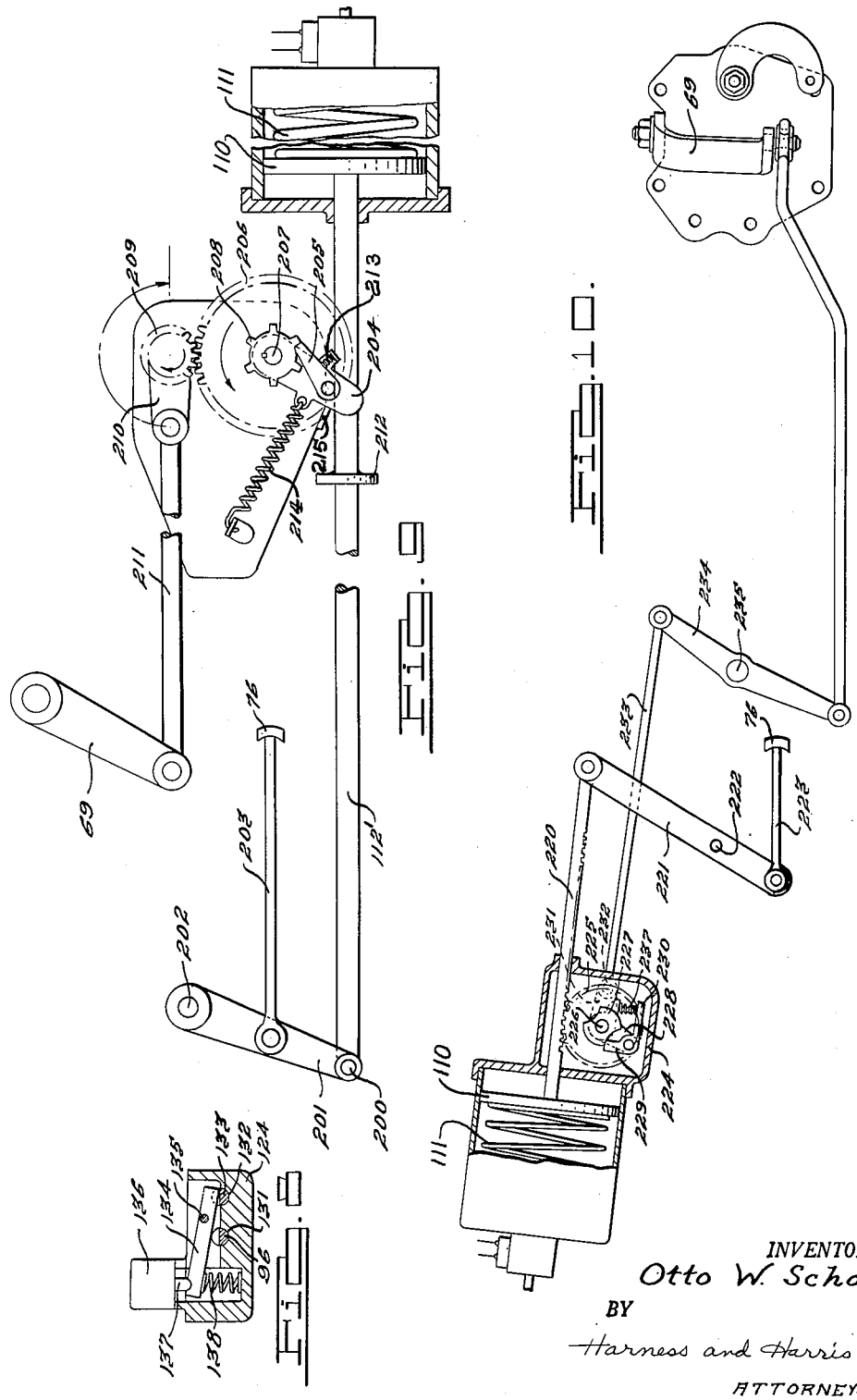

Patented Dec. 16, 1952

2,621,525

UNITED STATES PATENT OFFICE 2,621,525

CONTROL FOR MOTOR VEHICLE TRANSMISSIONS

Otto W. Schotz, Detroit, Mich., assignor to Chrysler Corporation, Highland Park, Mich., a corporation of Delaware Application September 21, 1946, Serial No. 698,451

3 Claims. (Cl. 74—110)

This invention relates to automotive vehicle transmission controls and more particularly to automatic means for changing the speed ratio drive of the transmission.

An automatic transmission control is described and claimed in application Serial No. 661,298 filed April 11, 1946, by C. A. Neracher and Maurice C. Robinson. The present invention is adapted to perform similar functions to those performed by the apparatus in the above application, Serial No. 661,298. However, the apparatus described in that application utilizes a vacuum cylinder that has suitable valving to effect movement of a piston in either of two directions by vacuum. This type of vacuum cylinder is usually referred to as a "double acting" cylinder. The present invention is designed to use a "single acting" vacuum cylinder and piston to actuate the transmission control. In a "single acting" system the piston is moved in one direction by vacuum and returned by a spring. This fundamental difference in cylinder and piston construction is important in that the entire cycle of operation of the apparatus is changed thereby.

The piston of a "double acting" system moves in a first direction to effect one speed ratio drive and in another direction to effect a second speed ratio drive. The piston of a "single acting" system makes the same movement when either speed ratio drive is effected. The piston moves in a first direction and is returned to its original position for each change of speed ratio drive. In the "double acting" system the direction of movement of the piston determines which speed ratio drive will be obtained. In the "single acting" system the movement of the piston is always the same (advance and return) and auxiliary means, frequently referred to as an alternator mechanism, determines which speed ratio drive will be obtained.

Both apparatuses are responsive to driver signal as, for example, by throttle closing within predetermined vehicle speed limits to initiate a cycle including a clutch disengagement, a change in transmission speed ratio drive and a clutch reengagement.

The single acting system possesses advantages in the elimination of valves and the fact that movement of the piston in one direction is available for disengaging the clutch and movement of the piston in a second direction (the spring return) is available for reengaging the clutch. In the double acting system, movement of the piston in one direction must accomplish both of these actions as well as change the speed ratio drive in the transmission. The problem of timing becomes acute in a double acting system.

In the drawings:

Fig. 3 is a diagrammatic view of the entire system;

Fig. 4 is a sectional elevational view of a portion of the mechanism carried by the transmission housing;

Fig. 5 is a section on the line 5—5 of Fig. 4;

Fig. 6 is a section on the line 6—6 of Fig. 4;

Fig. 7 is a horizontal section of the selector apparatus;

Fig. 8 is a vertical sectional view on the line 8—8 of Fig. 7;

Fig. 9 is a diagrammatic view of a modified form of control apparatus; and

Fig. 10 is a diagrammatic view of another form of control apparatus.

Figure 1:
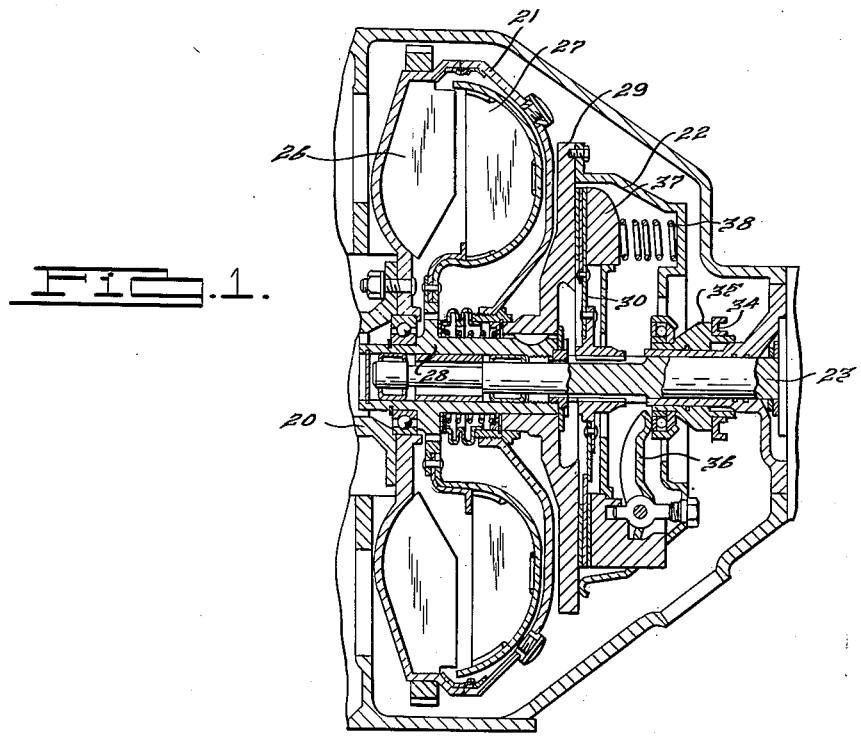
Fig. 1 is a vertical section of a fluid drive and clutch assembly.

In a motor vehicle, the usual internal combustion engine having a crankshaft 20 transmits drive through a fluid coupling 21 and a conventional type of friction main clutch 22 through shaft 23 to a variable speed ratio transmission 24 from which the drive passes from the output shaft 25 to the vehicle rear wheels in the usual manner.

The engine crankshaft 20 carries the vaned fluid coupling impeller 26 which in the well known manner drives the vaned runner 27 whence the drive passes through hub 28 to clutch driving member 29. This member then transmits the drive when clutch 22 is engaged as in Fig. 1, through driven member 30 to the transmission driving shaft 23 carrying the main drive pinion 32. A clutch pedal 33 controls clutch 22 such that when the driver depresses this pedal yoke 34 and collar 35 are thrust forward to cause levers 36 to release the clutch driving pressure plate 37 against springs 38 thereby releasing the drive between runner 27 and shaft 23. The primary function of the main clutch 22 is to enable shifts to be made manually or automatically in transmission 24. The reasons for the use of a fluid coupling are explained in application, Serial No. 661,298, by Carl A. Neracher and Maurice C. Robinson.

Figure 2:
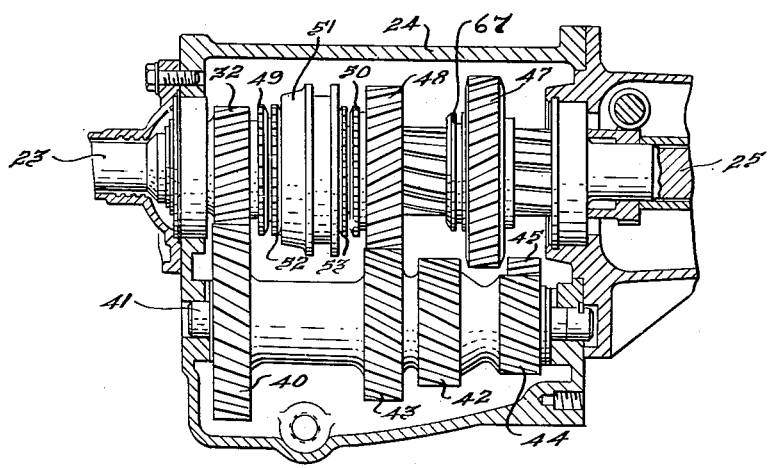
Fig. 2 is a vertical section of a transmission.

Referring to the transmission in Fig. 2 the main drive pinion 32 is in constant mesh with the gear 40 of the countershaft gear cluster mounted for rotation on the countershaft 41. This gear cluster according to well known practice, comprises a low speed gear 42, a second speed gear 43, and a reverse gear 44 which is in constant mesh with the reverse idler gear 45. The transmission driven shaft 25 extends rearwardly to drive the ground wheels of the vehicle.

The driven shaft 25 has mounted thereon the low speed and reverse gear 47 splined to the driven shaft for selective meshing with the countershaft low speed gear 42 or the reverse idler gear 45 for respectively transmitting low speed drive to the driven shaft 25 or the drive thereto in a reverse direction. Freely rotatable on shaft 25 is the second speed gear 48 in constant mesh with the countershaft gear 43 for transmitting a second speed ratio drive. The gear 32 drivingly carries a set of circumferentially spaced external clutch teeth 49. In a similar manner the gear 48 drivingly carries a set of clutch teeth 50.

Splined on the shaft 25 adjacent the forward extremity thereof, is an axially shiftable collar or sleeve 51. Blocker teeth rings 52 and 53 are carried by sleeve 51 and are provided with friction means (not shown) adapted to selectively cooperate with friction means provided with teeth 49 and 50. The blocker teeth rings 52 and 53 are adapted for slight rotation relative to sleeve 51 to facilitate synchronizing of gear speeds prior to clutching of shaft 25 through collar 51 with either gears 32 or 48 in a manner well known in the art.

The transmission is illustrated in its neutral position. To establish the direct or high speed driving connection between shafts 23 and 25, the collar 51 may be shifted axially to the left as viewed in Fig. 2 by the control means hereinafter described to engage the teeth 49 drivingly connected to the gear 32 carried by the driving shaft 23. The collar is drivingly carried by the shaft 25. The second speed driving connection is established by similarly moving the collar 51 to the right as viewed in Fig. 2 to engage teeth 50 carried by gear 48. The first or low speed is obtained by moving gear 47 which is splined to driven shaft 25 forwardly in Fig. 2 into engagement with the countershaft low speed gear 42. The drive then occurs from shaft 23 through main drive pinion 32, countershaft gear 40, countershaft low speed gear 42, gear 47, and driven shaft 25. Reverse drive is obtained by engaging gear 47 with reverse idler gear 45. The transmission mechanism thus described is an embodiment conventionally employed in motor vehicles.

Transmission 24 is provided with control means comprising selector cam 55 keyed to shaft 56 which is keyed to selector lever 57. Rotation of selector lever 57 rotates cam 55, the outward end of cam 55 is lifted by this movement (see Figs. 4 and 5). Control shaft 58 (Fig. 4) is rotatably mounted in the transmission housing. Cylindrical lever 59 surrounds shaft 58 and pin 60 mounted normally to the axis of the shaft fastens the lever to the shaft. Relative axial rotation is prevented by pin 60 but slight rotation of lever 59 on pin 60 is possible. Cylindrical lever 59 is provided with finger 61 adapted to penetrate the openings provided in forks 62 and 63 on shift rails 64 and 65. Spring 66 urges finger 61 to its downward position. Fork 62 engages collar 67 on low speed and reverse gear 47. Fork 63 engages collar 51 for selecting second or direct transmission drive. Gear shift fork guide rail 68 supports the weight of forks 62 and 63. As illustrated in Fig. 4, finger 61 is normally in engagement with the fork 63 on the second speed and direct drive shift rail.

In operation, finger 61 is lifted or lowered to select the fork 62 or 63 which finger 61 is to move. Rotation of shaft 58, cylindrical lever 59, and finger 61 moves the selected shift rail, fork, and collar to the left or right in Fig. 2 depending upon the direction of rotation of shaft 58. A shiftable control element in the form of a lever 69 is provided and keyed to shaft 58 to rotate the latter.

Manual means are provided in the apparatus illustrated in Fig. 3 for the operation of the clutch and control of the transmission speed ratio drive. The clutch pedal 33 is rotatably mounted at 70 on a shaft, not shown. An extension 33' of clutch pedal 33 depends below rotatable mounting 70 and has fixed thereto a pin 71. A torque shaft 72 has one end thereof rotatably mounted on the vehicle frame, not shown, and the other end rotatably mounted adjacent the engine block, not shown, in a manner well known in the art. An arm 77 is keyed to shaft 72. A rod 79 operatively connects pin 78 on arm 77 with pin 71 on clutch pedal 33. A slot 80 provided in rod 79 permits relative movement in one direction between rod 79 and pin 78. An arm 73 is keyed to torque shaft 72. A rod 75 connects arm 73 with clutch throwout fork 76 which is pivoted at 76'. Clutch throwout fork 76 engages collar 34 (Fig. 1). It will thus be seen that depression of clutch pedal 33 rotates extension 33' about rotatable mounting 70 and through pin 71 retracts rod 79 and rotates arm 77, shaft 72 and arm 73 to push the rod 75 and rotate clutch throwout fork 76 about its pivotal mounting 76' thereby moving collar 34 and disengaging the clutch 22.

A manual shift control rod 82 is shown in Fig. 3 as supported by the steering column housing 83 by bracket 84. The manual shift control rod 82 is slidably mounted in the bracket 84 and adapted for both axial and rotary movement. As is usual in the art, the axial movement is adapted to select the transmission shift rail 64 or 65 which is to be moved by finger 61 (Fig. 4), and rotation of the shift control rod 82 slides the shift rail in one of two directions (depending upon the direction of rod rotation) through the rotation of shaft 58 (Fig. 4) as described above. This effects the desired transmission speed ratio drive connection. A pair of spaced circumferential collars 85 and 86 located adjacent the base of rod 82 receive therebetween the end of a lever 87 which is rotatably mounted adjacent its mid portion to the steering column housing 83. A rod 88 connects lever 87 with transmission selector lever 57. Axial movement of rod 82 is transmitted through this linkage to the selector lever 57.

An arm 89 is keyed to rod 82. A depending rod 92 connects rod 91 with a rotatable lever 93 mounted on shaft 94. A rod 96 connects an arm 95 of lever 93 with means to be described and which is associated with transmission shift lever 69. Rotation of rod 82 through the linkage just described rotates shift lever 69 and shaft 58 (Fig. 4) for manual transmission control.

Referring to Fig. 3, an automatic transmission control which has been superimposed upon the above manual control will be described. The automatic control is adapted to actuate both the clutch 22 and the transmission shift control lever 69. An airtight housing 106 containing a cylinder 107 has a tubular connection 108 with the engine intake manifold. A solenoid valve 109 is adapted to selectively open and close this connection and vent cylinder 107. A piston 110 is slidably mounted in cylinder 107 and a spring 111 acting on piston 110 and reacting on housing 106 urges piston 110 to one end of cylinder 107. Manifold low pressure or vacuum as it is commonly referred to, overcomes spring 111 when valve 109 is open. A power operated member in the form of a piston rod 112 has a rod 113 rotatably secured to one end thereof. Rod 113 is connected by pin 114 with an arm 115 rotatably mounted on torque shaft 72. The arm 115 is provided with an extension 116 adapted to engage the arm 73 when arm 115 is rotated in a counterclockwise direction. When cylinder 107 is connected with the manifold through valve 109 and tubular passage 108, piston 110 is moved to the right in Fig. 3 and piston rod 112 pulls on arm 113 which rotates arm 115 in a counterclockwise direction. The extension 116 on arm 115 engages and carries therewith the arm 73. Rotation of the arm 73 pushes rod 75, rotates clutch throwout fork 76, and disengages the clutch 22. The rotation of the arm 77 in this counterclockwise direction does not cause a depression of the clutch pedal 33 because of the cooperation of the slot 80 in rod 79 and the pin 78. This pin and slot combination permits counterclockwise rotation of arm 77 in Fig. 3 without an accompanying depression of clutch pedal 33. When valve 109 closes cylinder 107 to the manifold and vents the cylinder, spring 111 returns the parts described to their original position permitting the clutch to reengage. Clutch springs 38 supply the force for clutch reengagement.

The movement of piston 110 also effects changes in transmission speed ratio drive by the movement of transmission collar 51 illustrated in Fig. 2. The automatic apparatus herein effects changes of speed ratio drive between a relatively slow drive of the driven wheels and a relatively fast drive or between second and direct drive as particularly described in relation to the Fig. 2 transmission. An abutment 8 is rigidly secured to piston rod 112. A member 9 is slidably mounted on piston rod 112 for axial movement relative thereto and restrained against rotation relative to rod 112 by a conventional keyway (not shown). A spring 117 is concentric with rod 112 and abuts against abutment 8 and member 9. The member 9 is adapted to actuate an alternator mechanism which includes a rotatably mounted toothed member in the form of a pinion 118 which is rotatably mounted at 119 and carries four pins 120 which project laterally from one face thereof and parallel the axis of the pinion. A second rotatably mounted toothed member in the form of a pinion 121 having a circumference of substantially one-half the circumference of pinion 118, meshes with pinion 118 and is rotatably mounted at 122. A link or crank 123 is rotatably secured to pinion 121 adjacent its periphery. Link 123 is connected to a second member 124, which will be described, and a link 125 connects the second member to transmission shift lever 69. The member 9 has a pawl 126 rotatably mounted at 127 and adapted to individually engage pins 120 so that the pawl and pins 120 form cooperating elements adapted to impart rotation to pinion 118. An extension 127 on member 9 supports a spring 128 which reacts against pawl 126 urging it to rotate in a counterclockwise direction until it engages an abutment 129 on member 9. Movement of the piston 110 to the right in Fig. 3 under the influence of manifold suction moves abutment 8 to the right thereby compressing spring 117 and urging member 9 to the right. The pawl 126, which is in engagement with a pin 120, is prevented from rotating in a counterclockwise direction by the abutment 129 and, therefore, forces the pawl 120 to accompany it in its movement toward the right in Fig. 3. A complete stroke of piston 110 will thus cause approximately one-quarter of a revolution of pinion 118. The one-quarter revolution of pinion 118 will, because of the relative sizes of the pinions 118 and 121, cause approximately one-half of a revolution of pinion 121. The one-half revolution of pinion 121 is sufficient to move the link 123 to the right, a distance corresponding to twice the radius of the point on pinion 121 at which link 123 is rotatably mounted. This movement of 123 to the right is transmitted through the second member 124 and link 125 to transmission shift lever 69 which causes shaft 58 in Fig. 4 to rotate and move collar 51 in a manner previously described to effect a change in speed ratio drive in the transmission. The disengagement of clutch 22 was previously described as an incident to motion of piston 110. It is to be understood that the disengagement of clutch 22 and movement of transmission shift lever 69 are both occasioned by movement of piston 110 to the right in Fig. 3. The spring 117 permits a slight delay to occur after the piston motion has begun and before movement of member 9 is initiated. The clutch disengagement occurs during this interval, when the piston 110 has completed its movement to the right and the valve 109 is closed to the manifold and vented to the atmosphere by means to be described herein. The spring 111 forces piston 110 to return to the position illustrated in Fig. 3 at the left end of the cylinder 106. This return motion of the piston permits the clutch pressure springs 38 to reengage the clutch and the motion of the abutment 8 to the left relaxes the compression of spring 117 and permits member 9 to move to the left. Pawl 126 does not restrict the movement of member 9 because of its rotatable mounting at 127 and the resilient nature of spring 128. Pawl 126 is able to snap over the pin 120 located in the lower left quadrant of the pinion 118. It should be noted that the return motion of piston 110 under the influence of spring 111 caused no rotation of pinion 118 or the associated pinion 121 and link 123. When the link 123 is positioned as illustrated in Fig. 3 with its connection to pinion 121 located on the left side of pinion 121, the next successive rotation of pinion 121 in a clockwise direction as an incident to movement of piston 110 under the influence of manifold suction, will move the link 123 to the right approximately 180° around the pinion 121. Repetition of this motion of pinion 121 in a clockwise direction will move link 123 to the left approximately 180° to return it to the position illustrated in Fig. 3. Successive movements of piston 110 to the right cause rotation of transmission lever 69 in opposite directions.

Referring to Figs. 7 and 8, the second member 124 previously referred to will be described. This member is adapted to select between manual or automatic movement of transmission shift lever 69. The second member 124 comprises a housing 130 having parallel tracks 131 and 132. The rod 96 previously referred to as a component of the manual linkage, is slidably mounted in track 131. A rod 133 operatively connected to the link 123 of the automatic control, is slidably mounted in track 132. Each of these rods, 96 and 133 are provided with a lateral notch so positioned that the notches are aligned when both the manual and automatic systems are in second speed position. A gate 134 is rotatably mounted at 135 and extends laterally of the housing 130. Rotation of the gate 134 about point 135 is used to selectively couple rod 96 or rod 133 with housing 130 by the engagement of the gate 134 with the notch in one of the rods. A solenoid 136 carries a plunger 137 located above the gate 134. A spring 138 urges the gate to rotate to the position illustrated in Fig. 8 in which the rod 96 is operatively connected to the housing 130 for manual control. Under these conditions the solenoid 136 is deenergized. When the solenoid 136 is energized, the plunger 137 rotates the gate 134 in a counterclockwise direction and overcomes the spring 138 to operatively connect the rod 133 with the housing 130 for movement of the housing 130 as an incident to the automatic impulse imparted by the link 123. The housing 130 carries the link 125 which is operatively connected to the transmission shift lever 69. Thus the solenoid 136 determines whether the manual rod 96 or the automatic rod 133 will impart motion to the housing 130, link 125, and transmission shift lever 69. In automatic operation the link 125 is alternately pushed and pulled by the housing 130. Thus each successive movement of piston 110 induces a motion of shift lever 69. These successive motions alternate between clockwise and counterclockwise rotation of the shaft 58. The spring 66 in Fig. 4 urges the finger 61 into engagement with the shift rail 65 at all times when the selector lever 57 is not actuated. During automatic control the selector 57 is not actuated. Therefore, the successive clockwise and counterclockwise motions of shift lever 69 cause the shift rail 65 to move alternately to the left and to the right in Fig. 6 thereby moving the collar 51 to the left and to the right and causing alternate drives to occur in second speed or direct drive in the transmission of Fig. 2.

Carburetor throttle lever 150 is controlled by accelerator pedal 151 through conventional linkage illustrated as rod 152 in Fig. 3. Rod 152 connected to accelerator pedal 151 has its other end connected to lever 150 rotatably mounted on carburetor 149. Thus actuation of accelerator pedal 151 through rod 152 rotates throttle lever 150.

Means to control the actuation of the piston 110 is illustrated in Fig. 3. The automatic means depends for actuation upon the closing of the switch 97 which is provided adjacent the base of rod 82. An arm 98 secured to the base of the shift control rod 82 is so positioned that when the rod 82 is lowered and rotated into the usual second speed position, the switch 97 is closed. A dash switch 99 is also provided for driver control of the selection of automatic drive.

A grounded source 160 of electric energy is connected through ignition switch 161 to dash selector switch 99. Two grounded circuits emanate from switch 97. The first circuit comprises conductor 162 connected to switch 97 which is adapted to be closed when the shift control rod 82 is placed in a predetermined position as described above. Electrical line 163 connects switch 97 with solenoid 136 which was previously described with reference to member 124. Conductor 164 grounds solenoid 136. The other circuit includes switch 159 adapted to be closed when the throttle is substantially closed. Line 158 connects switches 99 and 159. A two-way shift rail switch 166 having a finger 167 thereon adapted to be engaged by abutments on an extension 168 of the transmission shift rail 65 is provided. A first circuit in switch 166 is disconnected and a second circuit is connected when the shift rail has completed its movement. This switch movement alternates with each transmission speed ratio change on the shift rail 65. A vehicle speed responsive governor 169 has one inlet terminal 170 and two outlet terminals 171 and 172 and is adapted to connect the inlet terminal with one outlet terminal below a predetermined speed and with the other outlet terminal above the predetermined speed. Each outlet terminal is connected to one of the circuits referred to for switch 166. The inlet terminal of governor 169 is connected to throttle switch 159 by line 165. Line 173 connects the outlet terminal of switch 166 with solenoid valve 109 in manifold line 108. Line 174 grounds the circuit. Valve 109 is adapted to connect cylinder 107 with the manifold line 108 when energized and to close line 108 and vent cylinder 107 to atmosphere when not energized.

In the operation of the apparatus thus far described when the driver closes switches 97 and 99 to select automatic drive and then closes the throttle lever 159 above a predetermined vehicle speed, valve 109 is energized to admit vacuum to cylinder 107. Piston 110 is moved to the right in Fig. 3 and clutch 22 disengaged through the linkage 112, 113, 115, collar 73, rod 75, and clutch throwout fork 76. This action of the piston also causes a delayed movement of transmission shift lever 69 and shift rail 65 through abutment 8, spring 117, member 9, pawl 126, pinion 118, pinion 121, link 123, member 124, and link 125. The movement of shift lever 69 moves the shift rail 65 and its extension 168 breaks the circuit at switch 166 thereby deenergizing solenoid valve 109 and permitting spring 111 to move piston 110 to the left end of the cylinder permitting the clutch to reengage. The switch 166 is now connected with its other circuit and a complete electrical circuit will be made when the governor 169 connects the inlet terminal 170 with the other outlet terminal below a predetermined vehicle speed and the driver closes the throttle switch 159 by releasing accelerator pedal 151. The electrical circuit then being complete the solenoid valve 109 is energized and the piston 110 again moved to the right to repeat the process. The pinion 121 will this time move the transmission shift lever 69 in the reverse direction from that previously experienced. The shift rail 65 will be moved and the collar 51 moved to cause a second speed drive in the Fig. 2 transmission.

Figure 9 illustrates a modified mechanical connection between the vacuum cylinder and clutch and between the vacuum cylinder and transmission shift lever. The electrical control apparatus has been omitted from the Fig. 9 diagrammatic showing for simplicity. The vacuum cylinder 107, piston 110, and spring 111 are substantially the same as that illustrated in Fig. 3. The piston rod 112' is rotatably connected at 200 with a rotatable lever 201. Lever 201 is rotatably mounted on a shaft at 202. A link 203 is rotatably mounted on lever 201 between the points 200 and 202 and operatively connected with the clutch throwout lever 76. It will thus be seen that movement of piston 110 to the right will rotate lever 201 in a counterclockwise direction and move clutch throwout lever 76 to the right to effect a disengagement of the clutch. The return of piston 110 to the left under the influence of spring 111 will release the clutch and permit springs 38 in Fig. 1 to effect a clutch reengagement. A toothed member in the form of a pinion 206 is rotatably mounted on shaft 207 and carries ratchet teeth 208. A lever 204 is rotatably mounted on shaft 207 and carries a pawl 205. The lever 204 depends from shaft 207 and is adapted to be engaged by an abutment 212 carried by piston rod 112'. The abutment 212 is spaced to the left of the lever 204 so that the initial movement to the right of the piston rod 112' may be used to effect clutch disengagement before the abutment 212 picks up the lever 204. A second rotatably mounted toothed member in the form of a pinion 209 engages pinion 206 and has a rod 210 secured thereto. A rod or crank 211 is rotatably connected to rod 210 and connected to transmission shift lever 69. A spring 214 urges lever 204 to rotate in a clockwise direction.

In operation, when the piston 110 is moved to the right in Fig. 9 under the influence of manifold suction the piston rod 112', which is a power operated member, is moved to the right and during the initial stages of this movement the lever 201 is rotated in a counterclockwise direction and through rod 203 the clutch lever 76 is rotated and the clutch disengaged. Additional movement of the piston 110 to the right brings the abutment 212 into engagement with the lever 204 which then rotates in a counterclockwise direction and the pawl 205 thereon which is held in engagement with ratchet teeth 208 by spring 213 engages the teeth 208 and rotates the pinion 206 in a counterclockwise direction. Rotation of the pinion 206 causes clockwise rotation of the pinion 209 which rotates the rod 210 and performs the functions of a crankshaft to effect linear movement of rod 211. The linear movement is substantially equal to twice the length of rod 210. This linear movement causes a counterclockwise rotation of transmission shift lever 69 to effect a speed ratio change in the transmission. When the valve 109 is closed and cylinder 107 vented, the spring 111 returns the piston 110 to the left in Fig. 9. Piston rod 112' and abutment 212 are moved to the left. As the abutment 212 lifts away from lever 204, the spring 214 rotates the lever 204 in a clockwise direction and returns it to the position illustrated in Fig. 9 where it engages a fixed stop 215. A pawl 205 snaps over ratchet teeth 208 freely during this movement. Further movement of the piston rod 112' to the left retracts rod 203 and releases the clutch throwout lever 76.

Fig. 10 illustrates another form of the mechanical linkage. The piston 110 is slidably mounted in the cylinder 107 and urged to the right in Fig. 10 by the spring 111. Manifold suction draws piston 110 to the left in Fig. 10 as explained for the Fig. 3 form. The piston rod 220 is connected to one end of a lever 221 rotatably mounted at 222. The opposite end of the lever 221 is connected to link 223 which engages clutch throwout fork 76. It will thus be seen that movement of piston 110 to the left in Fig. 10 rotates lever 221 in a counterclockwise direction and moves link 223 to the right thereby rotating clutch throwout lever 76 and disengaging the clutch. Return of piston 110 to the right in Fig. 10 under the influence of spring 111 permits the clutch to reengage. The vacuum cylinder housing 106 has a supplemental housing 224 secured thereto. The piston rod 220 extends through housing 224. A toothed member in the form of a pinion 225 is rotatably mounted on a shaft 226 extending transversely of housing 224. The piston rod 220 is provided with gear teeth on its lower edge and forms a power operated toothed member in the form of a rack which engages the pinion 225. Thus linear movement of the piston rod 220 induces rotation of pinion 225. An abutment member 227 is carried by pinion 225. A lever 228 is keyed to the shaft 226 and has a pawl 229 rotatably mounted on it. The abutment member 227 is adapted to engage the pawl 229 and force the lever 228 and pawl 229 to rotate with the pinion 225. A lever 231 is keyed to shaft 226. Rotation of pinion 225 in a counterclockwise direction induced by the movement of piston rod 220 to the left in Fig. 10 causes a counterclockwise rotation of abutment member 227. Member 227 engages pawl 229 and rotates lever 228 in a counterclockwise direction. This rotates the shaft 226 and lever 231 in a counterclockwise direction. The size of pinion 225 is selected so that the full stroke of piston 110 to the left will cause substantially a 180° movement of pinion 225. This will cause a 180° rotation of the lever 231. The outer end 232 of the lever 231 has rotatably connected thereto a rod 233. Rotation of lever 231 through the 180° arc will cause the end 232 to induce linear motion in rod 233. The linear motion will be equal to twice the radius of lever 231. The linear motion of rod 233 is transmitted through a rotatable lever 234, rotatably mounted at 235 to a rod 236 which connects the opposite end of rod 234 with transmission shift lever 69. Pawl 229 is provided with an extension 230 which carries a spring 237. The spring urges pawl 229 into engagement with abutment member 227 but permits the pawl to move out of the way of abutment member 227 when the latter is rotated in a clockwise direction. When the piston 110 has completed its stroke to the left in Fig. 10 under the influence of manifold suction and when the cylinder 106 is vented and spring 111 returns the piston to the right in Fig. 10, a clutch reengagement occurs. The movement of the piston rod 220, lever 221, and rod 223 permits the clutch throwout springs 38 to reengage the clutch. This movement rotates the pinion 225 in a clockwise direction and the abutment member 227 freely rotates past the pawl 229. The spring 237 causes the pawl 229 to engage the abutment member 227 preparatory to the next power stroke of the piston 110.

I claim:

1. An alternator mechanism adapted to be used in a motor vehicle speed change mechanism having a shiftable control element; said alternator mechanism including a power operated toothed member mounted for and adapted to be moved a predetermined distance in a first direction, a rotatably mounted member having teeth in drive receiving relationship with the teeth of said toothed member and being rotatable through an arc of one hundred and eighty degrees in response to each movement of said first member through said predetermined distance in said first direction, and a crank drivingly connected to said rotatably mounted member and adapted to be connected to said shiftable control element for shifting said control element in opposite directions in response to successive movements of said power operated toothed member in its first direction.

2. An alternator mechanism adapted to be used in a motor vehicle speed change mechanism having a shiftable control element; said alternator mechanism including a first rotatably mounted toothed member, a power operated member mounted for linear movement for a predetermined distance in a first direction, cooperating elements carried respectively by said members and adapted to impart rotation through a predetermined arc to said first member in response to linear movement of said power operated member through said predetermined distance in said first direction, a second rotatably mounted member having teeth in drive receiving relationship with the teeth of said first member and being rotatable through an arc of one hundred and eightly degrees in response to each rotation of said first member through said predetermined arc and a crank drivingly connected to said rotatably mounted member and adapted to be connected to said shiftable control element for shifting said control element in opposite directions in response to successive movements of said power operated member through said predetermined distance in said first direction.

3. An alternator mechanism adapted to be used in a motor vehicle speed change mechanism having a shiftable control element; said alternator mechanism including a power operated toothed member mounted for linear movement for a predetermined distance in a first direction, a rotatably mounted member having teeth in drive receiving relationship with the teeth of said toothed member and being rotatable through an arc of one hundred and eightly degrees in response to each movement of said first member through said predetermined distance in said first direction, and a crank drivingly connected to said rotatably mounted member and adapted to be connected to said shiftable control element for shifting said control element in opposite directions in response to successive movements of said power operated toothed member in its first direction.

OTTO W. SCHOTZ.

REFERENCES CITED

The following references are of record in the file of this patent:

UNITED STATES PATENTS

| Number | Name | Date |
|---|---|---|
| 2,092,446 | Fleischel | Sept. 7, 1937 |
| 2,109,443 | Hill et al. | Feb. 22, 1938 |
| 2,212,282 | Van Buskirk | Aug. 20, 1940 |
| 2,351,067 | Randol | June 13, 1944 |
| 2,447,730 | Britton | Aug. 24, 1948 |